United States Patent
Chen et al.

(10) Patent No.: US 9,164,633 B2
(45) Date of Patent: Oct. 20, 2015

(54) TFT LIQUID CRYSTAL DISPLAY APPARATUS HAVING A TOUCH FUNCTION

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 276 days.

(21) Appl. No.: 13/758,341

(22) Filed: Feb. 4, 2013

(65) Prior Publication Data

US 2014/0104228 A1   Apr. 17, 2014

(30) Foreign Application Priority Data

Oct. 11, 2012   (TW) .............................. 101137382 A

(51) Int. Cl.
  *G06F 3/044* (2006.01)
  *G02F 1/1333* (2006.01)
  *G06F 3/041* (2006.01)

(52) U.S. Cl.
  CPC ............ *G06F 3/044* (2013.01); *G02F 1/13338* (2013.01); *G06F 3/0412* (2013.01); *G06F 3/0416* (2013.01)

(58) Field of Classification Search
  CPC ..... G06F 3/044; G06F 3/0416; G06F 3/0412; G02F 1/13338
  See application file for complete search history.

(56) References Cited

U.S. PATENT DOCUMENTS

| | | | | |
|---|---|---|---|---|
| 2010/0289994 A1* | 11/2010 | Nonaka | .......................... | 349/108 |
| 2011/0032241 A1* | 2/2011 | Jeong et al. | .................... | 345/212 |
| 2011/0130999 A1* | 6/2011 | Hung et al. | .................... | 702/117 |
| 2012/0068961 A1* | 3/2012 | Mizuhashi et al. | ............ | 345/174 |
| 2012/0075240 A1* | 3/2012 | Kida et al. | .................... | 345/174 |
| 2012/0162134 A1* | 6/2012 | Chen et al. | .................... | 345/174 |
| 2013/0093722 A1* | 4/2013 | Noguchi et al. | ............... | 345/174 |
| 2013/0105206 A1* | 5/2013 | Kim et al. | ...................... | 174/257 |
| 2013/0271391 A1* | 10/2013 | Tu et al. | ......................... | 345/173 |

* cited by examiner

Primary Examiner — Aneeta Yodichkas
(74) Attorney, Agent, or Firm — Ming Chow; Sinorica, LLC

(57) ABSTRACT

A TFT liquid crystal display apparatus having a touch function, including: a first electrode layer, having multiple first electrodes and multiple thin film transistors, wherein each of the multiple thin film transistors has a source coupled to a source control unit, a gate coupled to a gate control unit, and a drain coupled to one of the multiple first electrodes and to one of multiple storage capacitors; a liquid crystal display layer, located above the first electrode layer; a transparent electrode layer, being located above the liquid crystal display layer and having multiple transparent strip electrodes; and multiple switches, of which each has a control end coupled with a mode control signal, a first contact coupled to one of the multiple transparent strip electrodes, a second contact coupled to a common voltage generation unit, and a third contact coupled to a touch detection unit.

37 Claims, 11 Drawing Sheets

TFT LIQUID CRYSTAL DISPLAY APPARATUS HAVING A TOUCH FUNCTION

The current application claims a foreign priority to the patent application of Taiwan No. 101137382 filed on Oct. 11, 2012.

BACKGROUND OF THE INVENTION

1. Field of the Invention

The present invention relates to a touch apparatus, especially to a TFT (thin film transistor) liquid crystal display apparatus having a touch function, which is capable of utilizing a liquid crystal display structure to execute a capacitive touch detection procedure.

2. Description of the Related Art

General touch screen apparatuses have a touch module stacked on a liquid crystal screen. However, this kind of touch screen apparatuses tends to have larger depths, which can fail to meet the market requirements on lightness and thinness, and can result in higher material cost.

To cope with this issue, one solution is to integrate two layers of same material, one of which comes from a liquid crystal screen and the other of which comes from a touch module, into one layer. However, the depth of a touch screen apparatus reduced by this kind of designs still cannot meet the requirements of some high end products.

Another solution is to integrate a touch function into a liquid crystal display, generally by adding extra electrodes on a thin film transistor layer to form touch capacitors. However, this kind of designs tends to reduce product yield rate and increase manufacturing cost.

To solve the foregoing problems, a novel, slim, and easy-to-manufacture touch screen apparatus is needed.

SUMMARY OF THE INVENTION

One objective of the present invention is to disclose a TFT liquid crystal display apparatus having a touch function, which is capable of utilizing a liquid crystal display structure to detect a touch event.

Another objective of the present invention is to disclose a TFT liquid crystal display apparatus having a touch function, which is capable of utilizing two electrode layers of a liquid crystal display structure to execute a self capacitive touch detection procedure or a mutual capacitive touch detection procedure.

Another objective of the present invention is to disclose a TFT liquid crystal display apparatus having a touch function, which is capable of utilizing an electrode layer of a liquid crystal display structure to execute a self capacitive touch detection procedure or a mutual capacitive touch detection procedure.

Another objective of the present invention is to disclose a TFT liquid crystal display apparatus having a touch function, which is capable of utilizing a liquid crystal display structure to execute a multi-stage touch detection procedure to detect a touch event in a much shorter time.

Another objective of the present invention is to disclose a TFT liquid crystal display apparatus having a touch function, which is capable of utilizing a liquid crystal display structure to execute a parallel touch detection procedure to detect a touch event in a much shorter time.

Another objective of the present invention is to disclose a TFT liquid crystal display apparatus having a touch function, which supports two touch planes.

Another objective of the present invention is to disclose a TFT liquid crystal display apparatus having a touch function, which is capable of utilizing an active 3D liquid crystal Lens array of a 3D TFT liquid crystal display to detect a touch event.

Still another objective of the present invention is to disclose a TFT liquid crystal display apparatus having a touch function, which is capable of simplifying the structure of a touch screen to reduce the depth, increase the yield rate, and reduce the manufacturing cost thereof.

To attain the foregoing objectives, a TFT liquid crystal display apparatus having a touch function is proposed, including:

a first electrode layer, having multiple first electrodes and multiple thin film transistors, wherein each of the multiple thin film transistors has a source, a gate, and a drain, the source being coupled to a source control unit, the gate being coupled to a gate control unit, and the drain being coupled to one of the multiple first electrodes and to one of multiple storage capacitors;

a liquid crystal display layer, located above the first electrode layer;

a transparent electrode layer, being located above the liquid crystal display layer and having multiple transparent strip electrodes, wherein a touch plane is provided above the transparent electrode layer and each of the multiple transparent strip electrodes opposes at least one of the multiple first electrodes; and multiple switches, each of which has a control end, a first contact, a second contact, and a third contact, the control end being coupled with a mode control signal, the first contact being coupled to one of the multiple transparent strip electrodes, the second contact being coupled to a common voltage generation unit, and the third contact being coupled to a first touch detection unit, wherein, when the mode control signal is at a first state, the first contact connects electrically with the second contact; and when the mode control signal is at a second state, the first contact connects electrically with the third contact.

In one embodiment, when the mode control signal is at the first state, the source control unit outputs multiple pixel signals, each coupled to the source of a corresponding one of the multiple thin film transistors; and when the mode control signal is at the second state, the source control unit provides a second touch detection unit to couple with the source of each of the multiple thin film transistors.

In one embodiment, the first touch detection unit has a first driving unit and a first detection unit, and the second touch detection unit has a second driving unit and a second detection unit.

In one embodiment, when the gate control unit makes the multiple thin film transistors turned off, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the second touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit and the second touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, the TFT liquid crystal display apparatus further includes a first substrate, which is located above the transparent electrode layer and implemented by a transparent material selected from a group consisting of glass, polycarbonate, Polymethylmethacrylate, Polyethylene Terephthalate, and any combinations thereof.

In one embodiment, the first electrode layer is located above a second substrate, and the second substrate is implemented by a transparent material selected from a group consisting of glass, polycarbonate, Polymethylmethacrylate, Polyethylene Terephthalate, and any combinations thereof.

To attain the foregoing objectives, another TFT liquid crystal display apparatus having a touch function is proposed, including:

a first electrode layer, having multiple first electrodes, multiple storage-capacitor top electrodes, and multiple thin film transistors, wherein each of the multiple thin film transistors has a source, a gate, and a drain, the source being coupled to a source control unit, the gate being coupled to a gate control unit, and the drain being coupled to one of the multiple first electrodes and to one of the multiple storage-capacitor top electrodes;

a liquid crystal display layer, located above the first electrode layer;

a transparent electrode layer, being located above the liquid crystal display layer and having multiple transparent strip electrodes, wherein a touch plane is provided above the transparent electrode layer and each of the multiple transparent strip electrodes opposes at least one of the multiple first electrodes;

multiple first switches, each of which has a first control end, a first contact, a second contact, and a third contact, the first control end being coupled with a mode control signal, the first contact being coupled to one of the multiple transparent strip electrodes, the second contact being coupled to a common voltage generation unit, and the third contact being coupled to a first touch detection unit, wherein, when the mode control signal is at a first state, the first contact connects electrically with the second contact; and when the mode control signal is at a second state, the first contact connects electrically with the third contact; and multiple second switches, each of which has a second control end, a fourth contact, a fifth contact, and a sixth contact, the second control end being coupled with the mode control signal, the fourth contact being coupled to one of multiple storage-capacitor bottom electrodes, the fifth contact being coupled to the common voltage generation unit, and the sixth contact being coupled to a second touch detection unit, wherein, when the mode control signal is at the first state, the fourth contact connects electrically with the fifth contact; and when the mode control signal is at the second state, the fourth contact connects electrically with the sixth contact.

In one embodiment, the source control unit outputs multiple pixel signals when the mode control signal is at the first state, and provides a third touch detection unit to couple with the source of each of the multiple thin film transistors when the mode control signal is at the second state.

In one embodiment, the first touch detection unit has a first driving unit and a first detection unit, the second touch detection unit has a second driving unit and a second detection unit, and the third touch detection unit has a third driving unit and a third detection unit.

In one embodiment, when the gate control unit makes the multiple thin film transistors turned off, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned off, the second touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned off, the first touch detection unit and the second touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the second touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the third touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit and the second touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the second touch detection unit and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit, the second touch detection unit, and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, the TFT liquid crystal display apparatus further includes a first substrate, which is located above the transparent electrode layer and implemented by a transparent material selected from a group consisting of glass, polycarbonate, Polymethylmethacrylate, Polyethylene Terephthalate, and any combinations thereof.

In one embodiment, the first electrode layer is located above a second substrate, and the second substrate is implemented by a transparent material selected from a group consisting of glass, polycarbonate, Polymethylmethacrylate, Polyethylene Terephthalate, and any combinations thereof.

To attain the foregoing objectives, still another TFT liquid crystal display apparatus having a touch function is proposed, including:

a first electrode layer, having multiple first transparent electrodes, multiple storage-capacitor top electrodes, and multiple thin film transistors, wherein a second touch plane is provided below the first electrode layer, and each of the multiple thin film transistors has a source, a gate, and a drain, the source being coupled to a source control unit, the gate being coupled to a gate control unit, and the drain being coupled to one of the multiple first transparent electrodes and to one of the multiple storage-capacitor top electrodes, wherein the source control unit outputs multiple pixel signals when a mode control signal is at a first state, and provides a third touch detection unit to couple with the source of each of the multiple thin film transistors when the mode control signal is at a second state;

a liquid crystal display layer, located above the first electrode layer;

a transparent electrode layer, being located above the liquid crystal display layer and having multiple second transparent electrodes, wherein a first touch plane is provided above the transparent electrode layer and each of the multiple second transparent electrodes opposes at least one of the multiple first transparent electrodes;

multiple first switches, each of which has a first control end, a first contact, a second contact, and a third contact, the first control end being coupled with the mode control signal, the first contact being coupled to one of the multiple second transparent electrodes, the second contact being coupled to a common voltage generation unit, and the third contact being coupled to a first touch detection unit, wherein, when the mode control signal is at the first state, the first contact connects electrically with the second contact; and when the mode control signal is at the second state, the first contact connects electrically with the third contact;

multiple second switches, each of which has a second control end, a fourth contact, a fifth contact, and a sixth contact, the second control end being coupled with the mode control signal, the fourth contact being coupled to one of multiple storage-capacitor bottom electrodes, the fifth contact being coupled to the common voltage generation unit, and the sixth contact being coupled to a second touch detection unit, wherein, when the mode control signal is at the first state, the fourth contact connects electrically with the fifth contact; and when the mode control signal is at the second state, the fourth contact connects electrically with the sixth contact; and a display-and-touch scan timing control unit, used for generating the mode control signal.

In one embodiment, when the gate control unit makes the multiple thin film transistors turned off, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned off, the second touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned off, the first touch detection unit and the second touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the second touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the third touch detection unit is used to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit and the second touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the second touch detection unit and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, when the gate control unit makes the multiple thin film transistors turned on, the first touch detection unit, the second touch detection unit, and the third touch detection unit operate cooperatively to perform a capacitive touch detection procedure, wherein the capacitive touch detection procedure is one selected from a group consisting of a self capacitive touch detection procedure, a mutual capacitive touch detection procedure, and any combinations thereof.

In one embodiment, the TFT liquid crystal display apparatus further includes a first substrate, which is located above the transparent electrode layer and implemented by a transparent material selected from a group consisting of glass, polycarbonate, Polymethylmethacrylate, Polyethylene Terephthalate, and any combinations thereof.

In one embodiment, the first electrode layer is an ITO (Indium Tin Oxide) layer located above a second substrate, and the second substrate is implemented by a transparent material selected from a group consisting of glass, polycarbonate, Polymethylmethacrylate, Polyethylene Terephthalate, and any combinations thereof.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
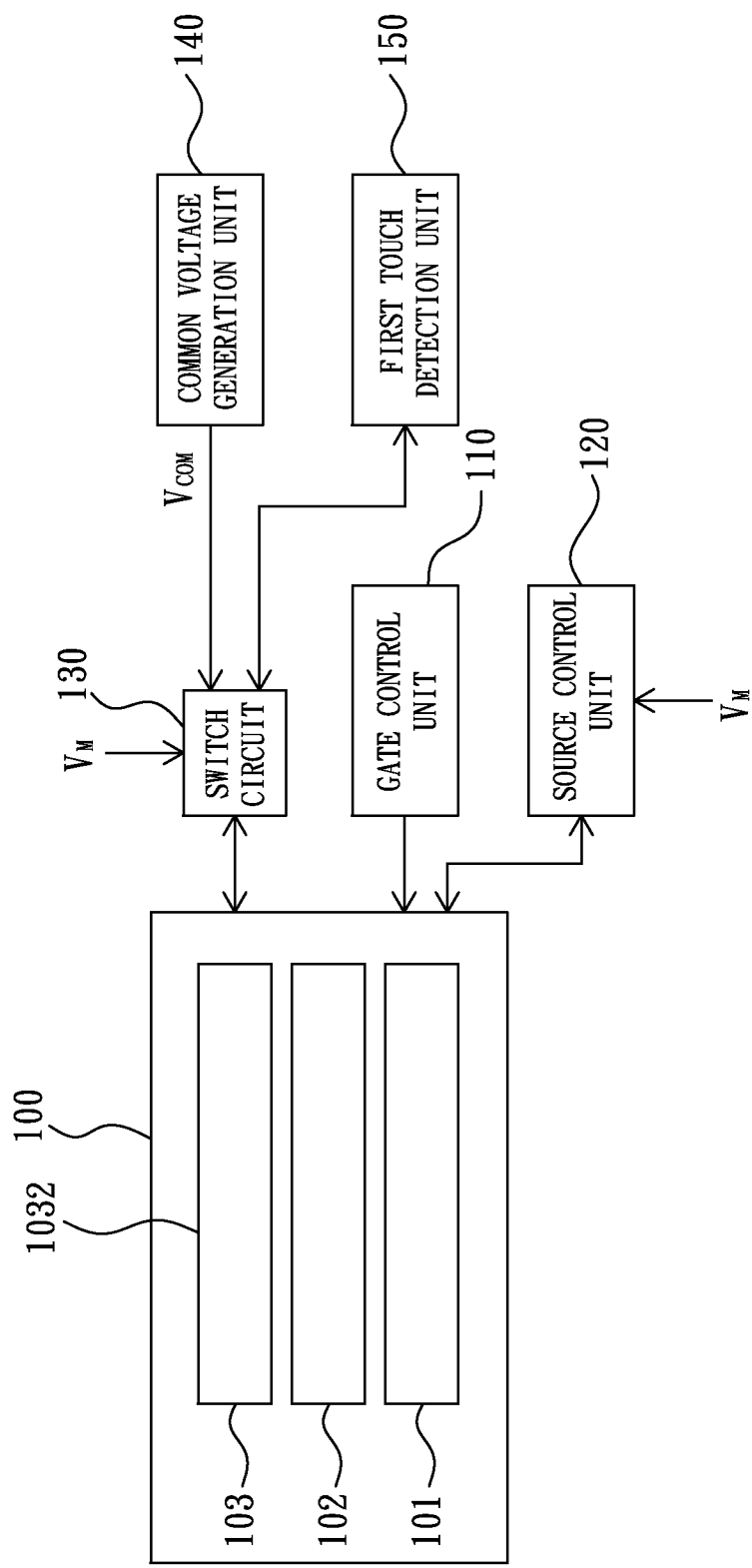
FIG. 1 illustrates a TFT liquid crystal display apparatus having a touch function according to a preferred embodiment of the present invention.

Please refer to FIG. 1, which illustrates a TFT liquid crystal display apparatus having a touch function according to a preferred embodiment of the present invention. As illustrated in FIG. 1, the TFT liquid crystal display apparatus having a touch function includes a liquid crystal display structure 100, a gate control unit 110, a source control unit 120, a switch circuit 130, a common voltage generation unit 140, and a first touch detection unit 150.

The liquid crystal display structure 100 has a first electrode layer 101, a liquid crystal display layer 102, and a transparent electrode layer 103.

Figure 2:
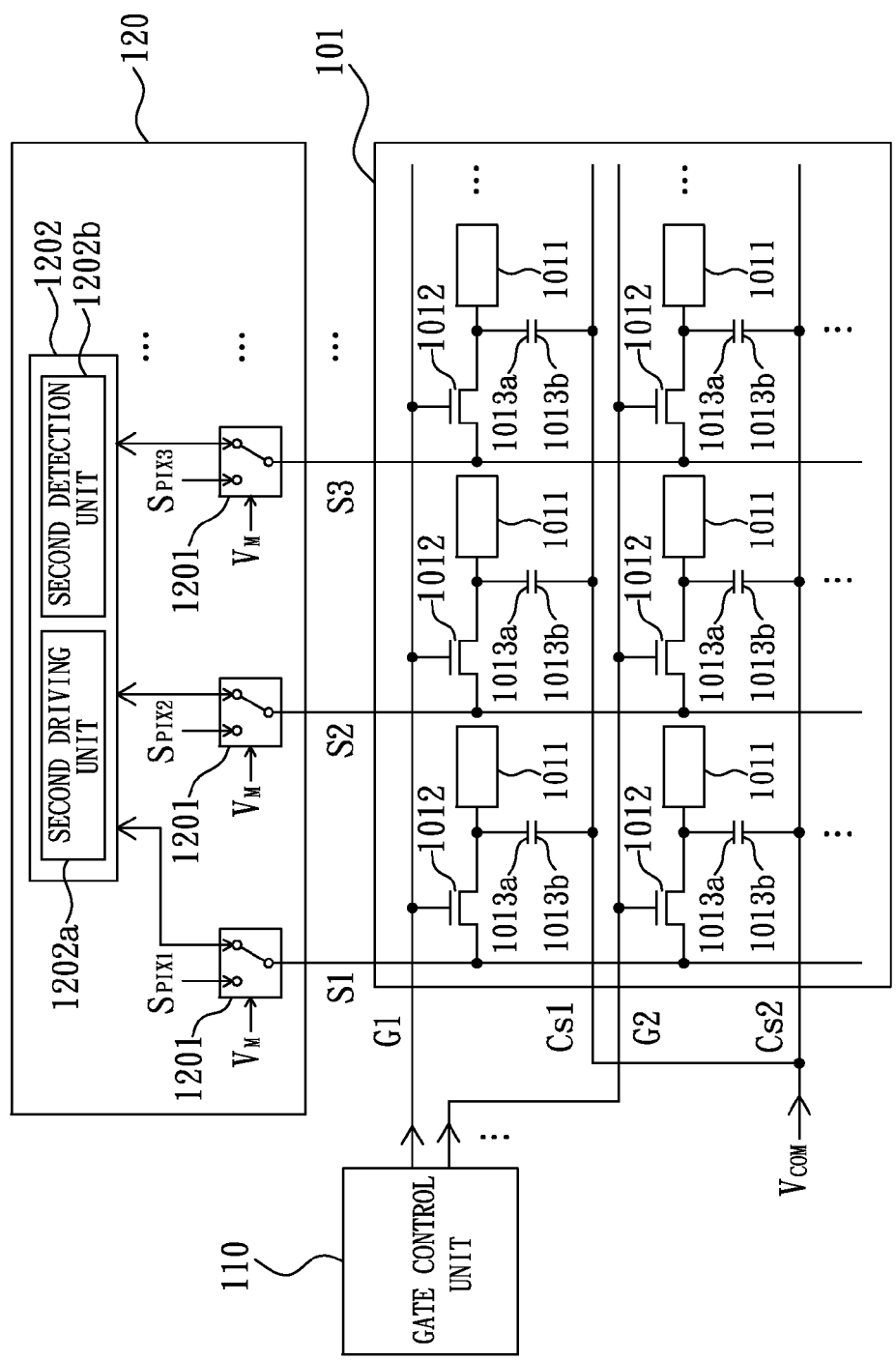
FIG. 2 illustrates a detailed structure of a first electrode layer of FIG. 1 and a circuit diagram formed by the first electrode layer, a gate control unit, and a source control unit.

FIG. 2 illustrates a detailed structure of the first electrode layer 101 and a circuit diagram formed by the first electrode layer 101, the gate control unit 110, and the source control unit 120. As illustrated in FIG. 2, the first electrode layer 101 has multiple first electrodes 1011, multiple thin film transistors 1012, and multiple storage-capacitor top electrodes 1013a. Each of the multiple thin film transistors 1012 has a source, a gate, and a drain, wherein the drain is coupled to one of the multiple first electrodes 1011 and to one of the multiple storage-capacitor top electrodes 1013a, the gate is coupled to one of multiple gate driving lines (G1, G2, . . . , Gn), and the source is coupled to one of multiple source driving lines (S1, S2, . . . , Sm). Each of the multiple gate driving lines is coupled with a row of the thin film transistors 1012, and each of the multiple source driving lines is coupled to a column of the thin film transistors 1012. Each of the multiple storage-capacitor top electrodes 1013a opposes one of multiple storage-capacitor bottom electrodes 1013b, each row of the multiple storage-capacitor bottom electrodes 1013b are coupled to one of multiple storage-capacitor driving lines (Cs1, Cs2, . . . , Csn), and the multiple storage-capacitor driving lines are coupled to a common voltage $V_{COM}$. Besides, the first electrode layer 101 can be located above a second substrate (not illustrated in the figure), and the second substrate can be implemented by a transparent material like glass, polycarbonate, Polymethylmethacrylate, or Polyethylene Terephthalate.

The gate control unit 110 is used to control the on/off of each row of the thin film transistors 1012 via the multiple gate driving lines.

The source control unit 120 has multiple switches 1201 and a second touch detection unit 1202, the second touch detection unit 1202 has a second driving unit 1202a and a second detection unit 1202b. Each of the multiple switches 1201 has a control end coupled with a mode control signal $V_M$, a first contact coupled to one of the multiple source driving lines, a second contact coupled to one of multiple pixel signals ($S_{PIX1}, S_{PIX2}, \ldots, S_{PIXm}$), and a third contact coupled to the second touch detection unit 1202. When the mode control signal $V_M$ is at a first state (for example, high level), the first contact of each of the multiple switches 1201 will be connected electrically with the second contact thereof; when the mode control signal $V_M$ is at a second state (for example, low level), the first contact of each of the multiple switches 1201 will be connected electrically with the third contact thereof.

Figure 3:
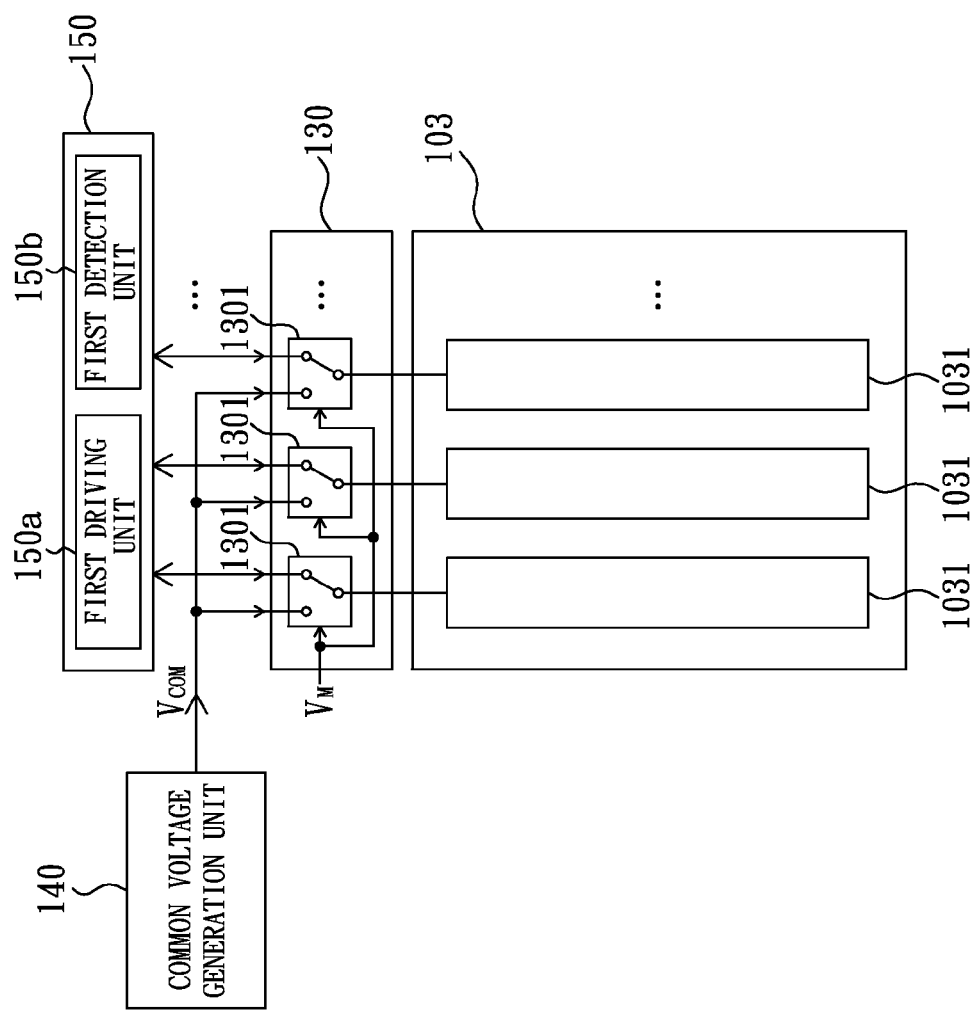
FIG. 3 illustrates a detailed structure of a transparent electrode layer of FIG. 1, and a circuit diagram formed by the transparent electrode layer, a switch circuit, a common voltage generation unit, and a first touch detection unit.

FIG. 3 illustrates a detailed structure of the transparent electrode layer 103, and a circuit diagram formed by the transparent electrode layer 103, the switch circuit 130, the common voltage generation unit 140, and the first touch detection unit 150. The transparent electrode layer 103 has multiple transparent electrodes 1031.

The switch circuit 130 has multiple switches 1301, each of which has a control end coupled with the mode control signal $V_M$, a first contact coupled to one of the multiple transparent electrodes 1031, a second contact coupled to the common voltage $V_{COM}$, and a third contact coupled to the first touch detection unit 150, wherein, when the mode control signal $V_M$ is at the first state, the first contact of each of the switches 1201 will be connected electrically with the second contact thereof; when the mode control signal $V_M$ is at the second state, the first contact of each of the switches 1201 will be connected electrically with the third contact thereof. The common voltage generation unit 140 is used to generate the common voltage $V_{COM}$. The first touch detection unit 150 has a first driving unit 150a and a first detection unit 150b.

Figure 4A:
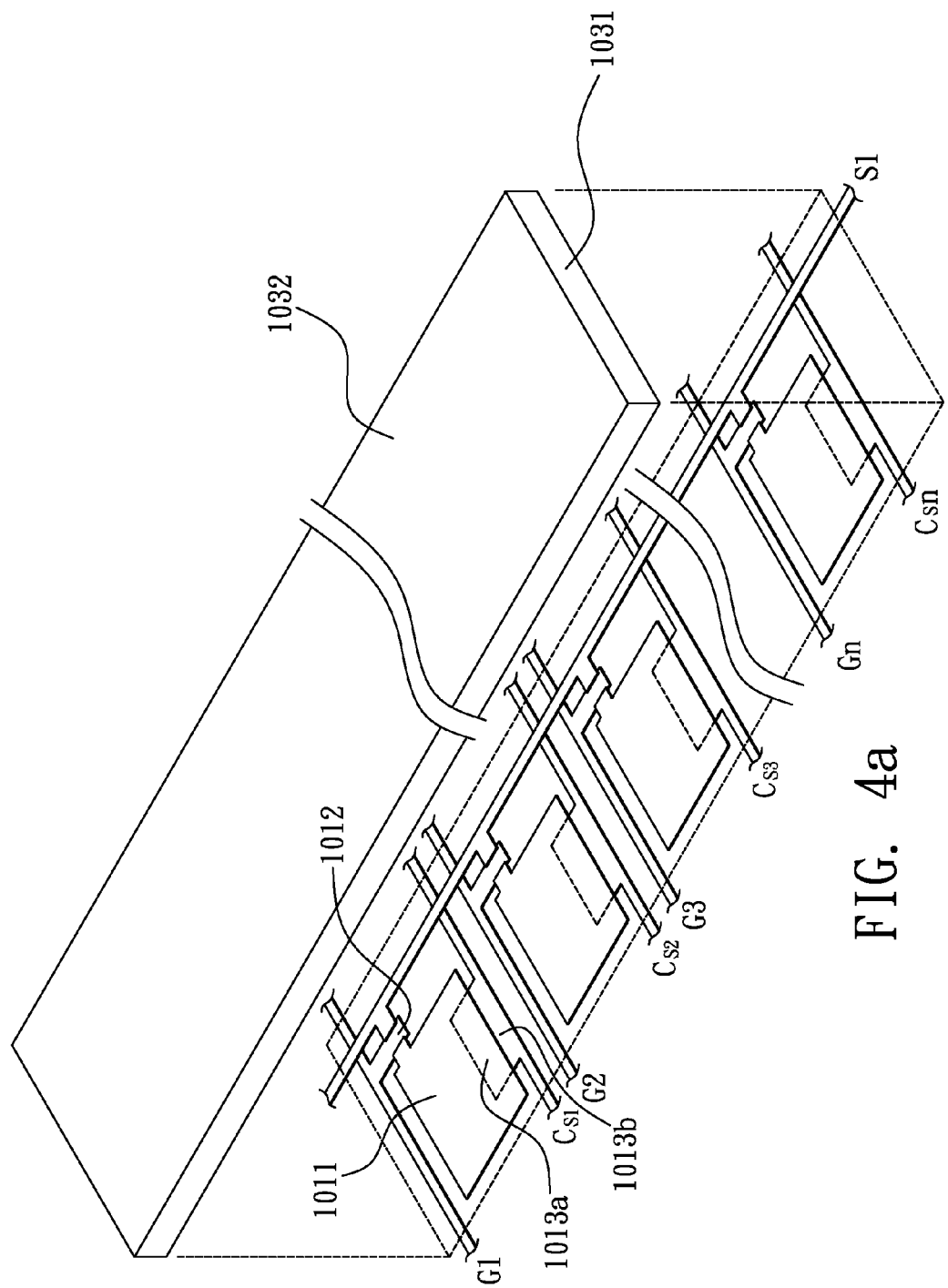
FIG. 4a illustrates a relative position between one of multiple transparent electrodes of FIG. 3 and a column of first electrodes of FIG. 2 in one embodiment of the present invention.

FIG. 4a illustrates a relative position between one of the multiple transparent electrodes 1031 and a column of the first electrodes 1011 in one embodiment of the present invention. As illustrated in FIG. 4a, one of the multiple transparent electrodes 1031 extends along one of the multiple source driving lines (S1) and opposes a column of the first electrodes 1011 (the liquid crystal display layer 102 is not shown in the figure).

Figure 4B:
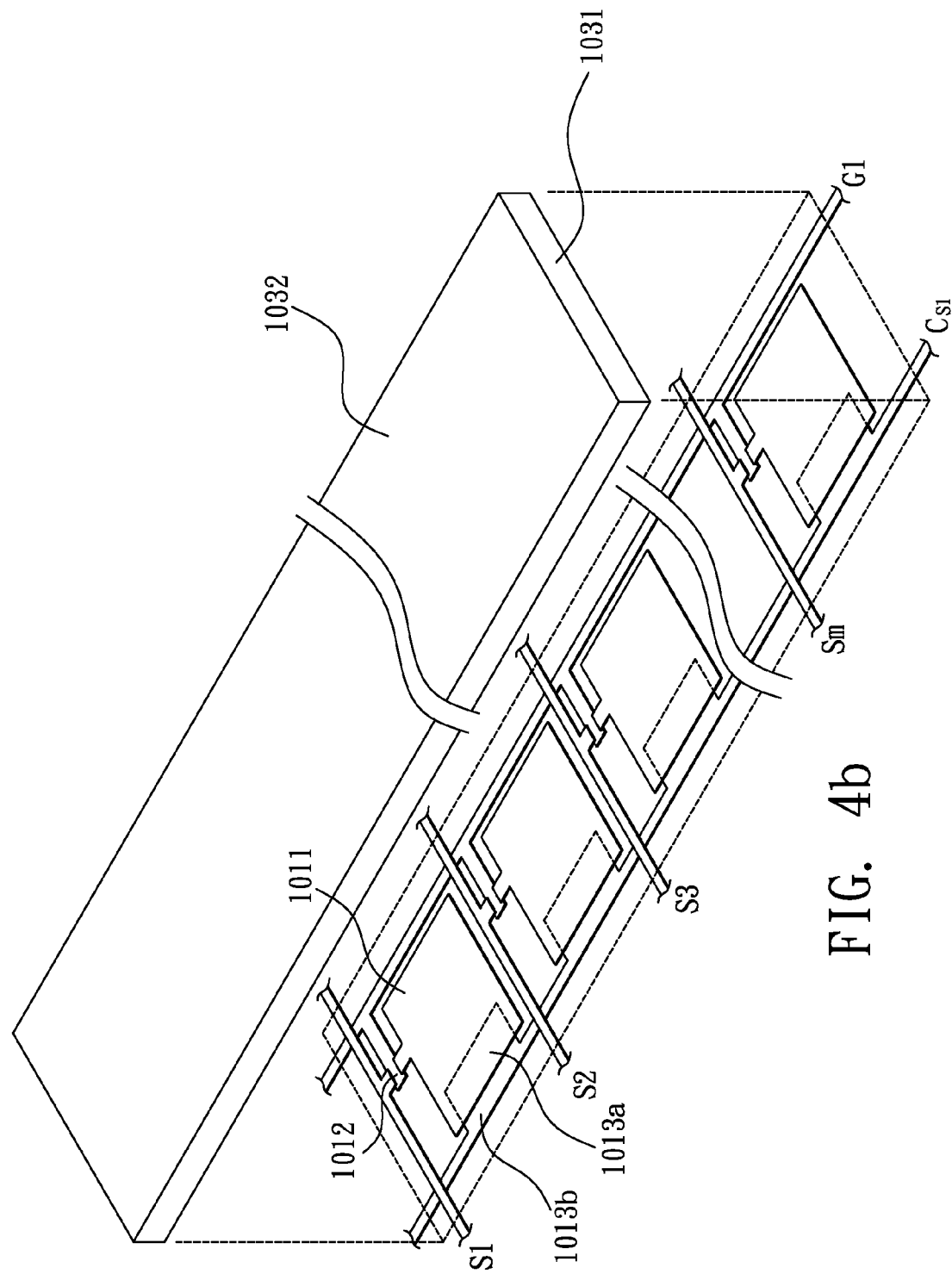
FIG. 4b illustrates a relative position between one of multiple transparent electrodes of FIG. 3 and a row of first electrodes of FIG. 2 in another embodiment of the present invention.

FIG. 4b illustrates a relative position between one of the multiple transparent electrodes 1031 and a row of the first electrodes 1011 in another embodiment of the present invention. As illustrated in FIG. 4b, one of the multiple transparent electrodes 1031 extends along one of the multiple gate driving lines (G1) and opposes a row of the first electrodes 1011 (the liquid crystal display layer 102 is not shown in the figure).

The transparent electrode layer 103 can be implemented by a transparent ITO (Indium Tin Oxide; ITO) layer, and the multiple transparent electrodes 1031 can be of rectangular shape, square shape, triangular shape, or round shape, etc. Besides, a first substrate (not shown in the figure), implemented by a transparent material like glass, polycarbonate, Polymethylmethacrylate, or Polyethylene Terephthalate, can be located above the transparent electrode layer 103 to provide a touch plane 1032.

The TFT liquid crystal display apparatus having a touch function of FIG. 1 can provide multiple touch detection modes. When the gate control unit 110 makes each row of the thin film transistors 1012 turned off, the first touch detection unit 150 can choose a part (the part can be whole) of multiple effective capacitors existing between the multiple transparent electrodes 1031 and the multiple storage-capacitor bottom electrodes 1013b to form a first sensing capacitor, and use the first sensing capacitor to perform a self capacitive detection procedure; or, choose two sets of electrodes of the multiple transparent electrodes 1031 to form a second sensing capacitor with each of the two sets of electrodes being connected electrically as one electrode, and use the second sensing capacitor to perform the self capacitive detection procedure or a mutual capacitive detection procedure.

The self capacitive detection procedure includes a charging step, a charge re-distribution step, and a comparison step. In the charging step, a touch voltage source (not shown in the figure) is provided by the first driving unit 150a to charge a sensing capacitor. In the charge re-distribution step, a charge-transfer capacitor (not shown in the figure) is provided by the first detection unit 150b to connect with the sensing capacitor in parallel. In the comparison step, a voltage on the charge-transfer capacitor is compared with a reference voltage (not shown in the figure) in the first detection unit 150b. When a touch event takes place, the voltage on the charge-transfer capacitor will rise up at a different speed, which is more quickly than when no touch event occurs. By this, the first detection unit 150b can therefore judge whether a touch event is happening on the sensing capacitor. As the charging step, the charge re-distribution step, and the comparison step of the self capacitive detection procedure are well known in prior art, they will not be further elaborated upon.

The mutual capacitive detection procedure includes a signal transmission step and a signal receiving step. In the signal transmission step, a voltage signal (a pulse train signal for example, not shown in the figure) is output by the first driving unit 150a to one side of the sensing capacitor. In the signal receiving step, the first detection unit 150b receives a sensed signal (not shown in the figure) from the other side of the sensing capacitor. Due to a fact that the voltage amplitude of the sensed signal is responsive to a touch event, the first detection unit 150b can therefore judge whether a touch event is happening according to the voltage amplitude of the sensed signal. As the mutual capacitive detection procedure is well known in prior art, it will not be further elaborated upon.

When the gate control unit 110 makes each row of the thin film transistors 1012 turned on, the first touch detection unit 150 and the second touch detection unit 1202 can operate independently or cooperatively to use the sensing capacitor formed in the liquid crystal display structure 100 to perform the self capacitive detection procedure or the mutual capacitive detection procedure. As a result, a variety of touch detection modes can be provided as follows:

1. The first touch detection unit 150 can choose a part (the part can be whole) of multiple effective capacitors existing between the multiple transparent electrodes 1031 and the multiple storage-capacitor bottom electrodes 1013b to form a third sensing capacitor, and use the third sensing capacitor to perform the self capacitive detection procedure; or, choose two sets of electrodes of the multiple transparent electrodes 1031 to form a fourth sensing capacitor with each of the two sets of electrodes being connected electrically as one electrode, and use the fourth sensing capacitor to perform the self capacitive detection procedure or the mutual capacitive detection procedure.

2. The second touch detection unit 1202 can choose a part (the part can be whole) of multiple capacitors existing between the multiple storage-capacitor top electrodes 1013a and the multiple storage-capacitor bottom electrodes 1013b to form a fifth sensing capacitor, and use the fifth sensing capacitor to perform the self capacitive detection procedure; or, choose two sets of electrodes of the multiple first electrodes 1011 to form a sixth sensing capacitor with each of the two sets of electrodes being connected electrically as one electrode, and use the sixth sensing capacitor to perform the self capacitive detection procedure or the mutual capacitive detection procedure.

3. The first touch detection unit 150 can operate cooperatively with the second touch detection unit 1202 to choose a part (the part can be whole) of multiple effective capacitors existing between the multiple transparent electrodes 1031 and the multiple first electrodes 1011 to form a seventh sensing capacitor, and use the seventh sensing capacitor to perform the self capacitive detection procedure or the mutual capacitive detection procedure. For example, the self capacitive detection procedure can be performed by the first touch detection unit 150 with the second touch detection unit 1202 providing a DC voltage; or performed by the second touch detection unit 1202 with the first touch detection unit 150 providing a DC voltage. The mutual capacitive detection procedure can be performed by having the first driving unit 150*a* of the first touch detection unit 150 providing a voltage signal, and the second detection unit 1202*b* of the second touch detection unit 1202 receiving a sensed signal; or the second driving unit 1202*a* of the second touch detection unit 1202 providing a voltage signal, and the first detection unit 150*b* of the first touch detection unit 150 receiving a sensed signal.

Besides, the self capacitive detection procedure and the mutual capacitive detection procedure can be mixed to increase efficiency in detecting a touch event.

Figure 5:
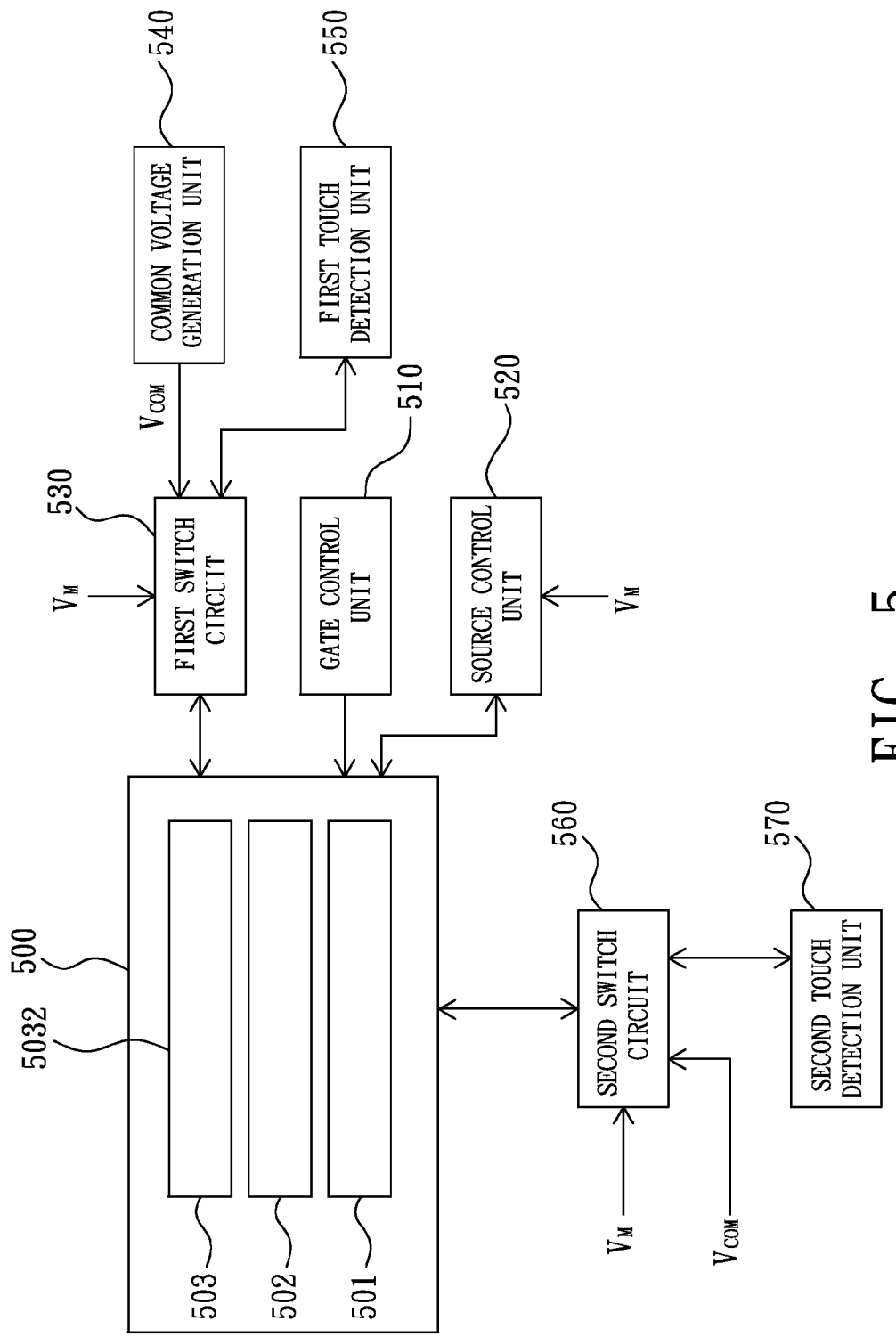
FIG. 5 illustrates a TFT liquid crystal display apparatus having a touch function according to another preferred embodiment of the present invention.

Based on the foregoing principle, the present invention proposes another embodiment. Please refer to FIG. 5, which illustrates a TFT liquid crystal display apparatus having a touch function according to another preferred embodiment of the present invention. As illustrated in FIG. 5, the TFT liquid crystal display apparatus having a touch function includes a liquid crystal display structure 500, a gate control unit 510, a source control unit 520, a first switch circuit 530, a common voltage generation unit 540, a first touch detection unit 550, a second switch circuit 560, and a second touch detection unit 570.

The liquid crystal display structure 500 has a first electrode layer 501, a liquid crystal display layer 502, and a transparent electrode layer 503.

Figure 6:
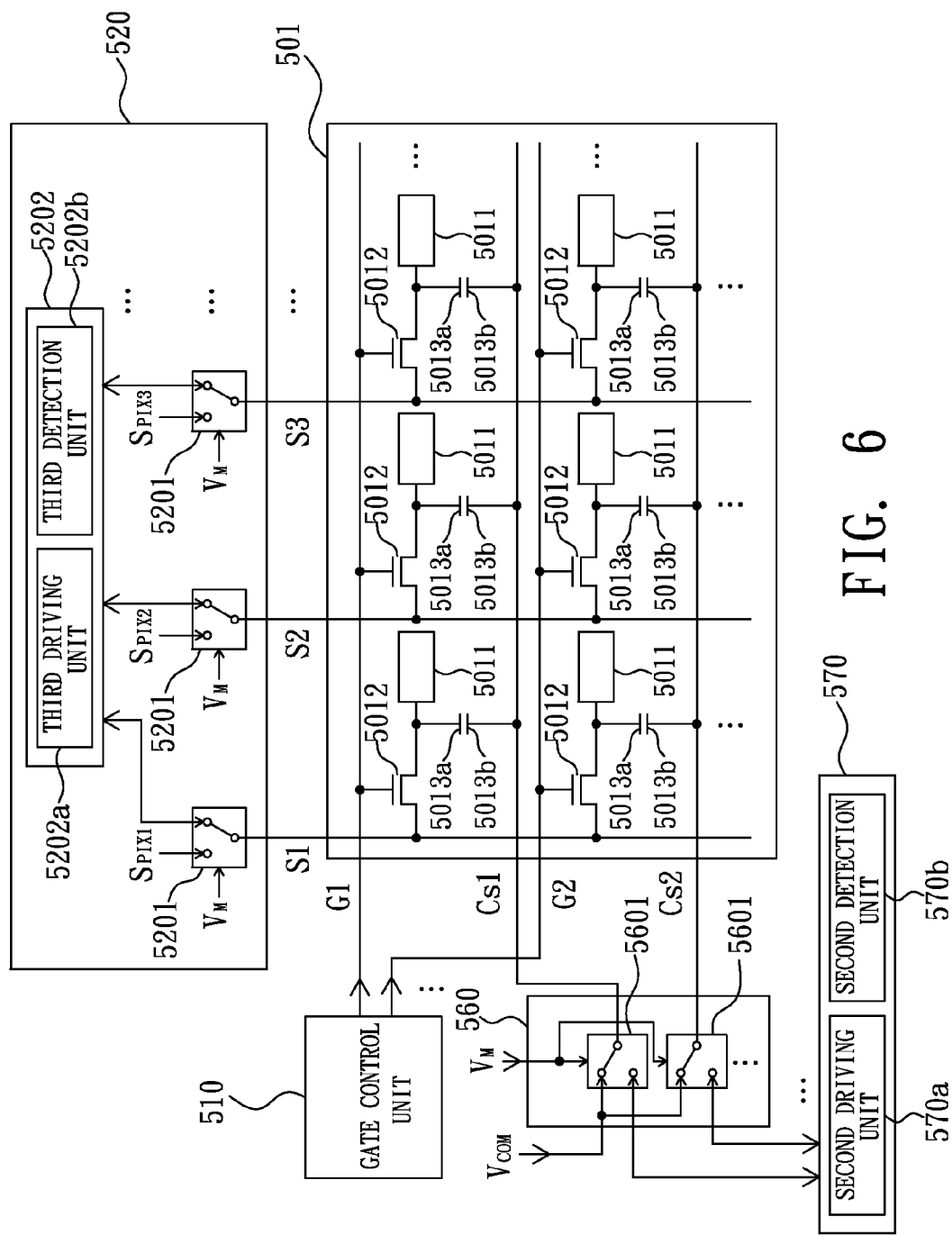
FIG. 6 illustrates a detailed structure of a first electrode layer of FIG. 5 and a circuit diagram formed by the first electrode layer, a gate control unit, a source control unit, a second switch circuit, and a second touch detection unit.

FIG. 6 illustrates a detailed structure of the first electrode layer 501 and a circuit diagram formed by the first electrode layer 501, the gate control unit 510, the source control unit 520, the second switch circuit 560, and the second touch detection unit 570. As illustrated in FIG. 6, the first electrode layer 501 has multiple first electrodes 5011, multiple thin film transistors 5012, and multiple storage-capacitor top electrodes 5013*a*. Each of the multiple thin film transistors 5012 has a source, a gate, and a drain, wherein the drain is coupled to one of the multiple first electrodes 5011 and to one of the multiple storage-capacitor top electrodes 5013*a*, the gate is coupled to one of multiple gate driving lines (G1, G2, . . . ), and the source is coupled to one of multiple source driving lines (S1, S2, . . . ). Each of the multiple gate driving lines is coupled with a row of the thin film transistors 5012, and each of the multiple source driving lines is coupled to a column of the thin film transistors 5012. Each of the multiple storage-capacitor top electrodes 5013*a* opposes one of multiple storage-capacitor bottom electrodes 5013*b*, and each row of the multiple storage-capacitor bottom electrodes 1013*b* are coupled to one of multiple storage-capacitor driving lines (Cs1, Cs2, . . . ). Besides, the first electrode layer 501 can be located above a second substrate (not illustrated in the figure), and the second substrate can be implemented by a transparent material like glass, polycarbonate, Polymethylmethacrylate, or Polyethylene Terephthalate.

The gate control unit 510 is used to control the on/off of each row of the thin film transistors 5012 via the multiple gate driving lines.

The source control unit 520 has multiple switches 5201 and a third touch detection unit 5202, and the third touch detection unit 5202 has a third driving unit 5202*a* and a third detection unit 5202*b*. Each of the multiple switches 5201 has a control end coupled with a mode control signal $V_M$, a first contact coupled to one of the multiple source driving lines, a second contact coupled to one of multiple pixel signals ($S_{PIX1}$, $S_{PIX2}$, . . . ), and a third contact coupled to the third touch detection unit 5202. When the mode control signal $V_M$ is at a first state (for example, high level), the first contact of each of the multiple switches 5201 will be connected electrically with the second contact thereof; when the mode control signal $V_M$ is at a second state (for example, low level), the first contact of each of the multiple switches 5201 will be connected electrically with the third contact thereof.

The second switch circuit 560 has multiple switches 5601, each of which has a control end coupled with the mode control signal $V_M$, a fourth contact coupled to one of the multiple storage-capacitor driving lines, a fifth contact coupled to the common voltage $V_{COM}$, and a sixth contact coupled to the second touch detection unit 570, wherein, when the mode control signal $V_M$ is at the first state, the fourth contact of each of the switches 5601 will be connected electrically with the fifth contact thereof; when the mode control signal $V_M$ is at the second state, the fourth contact of each of the switches 5601 will be connected electrically with the sixth contact thereof. The second touch detection unit 570 has a second driving unit 570*a* and a second detection unit 570*b*.

Figure 7:
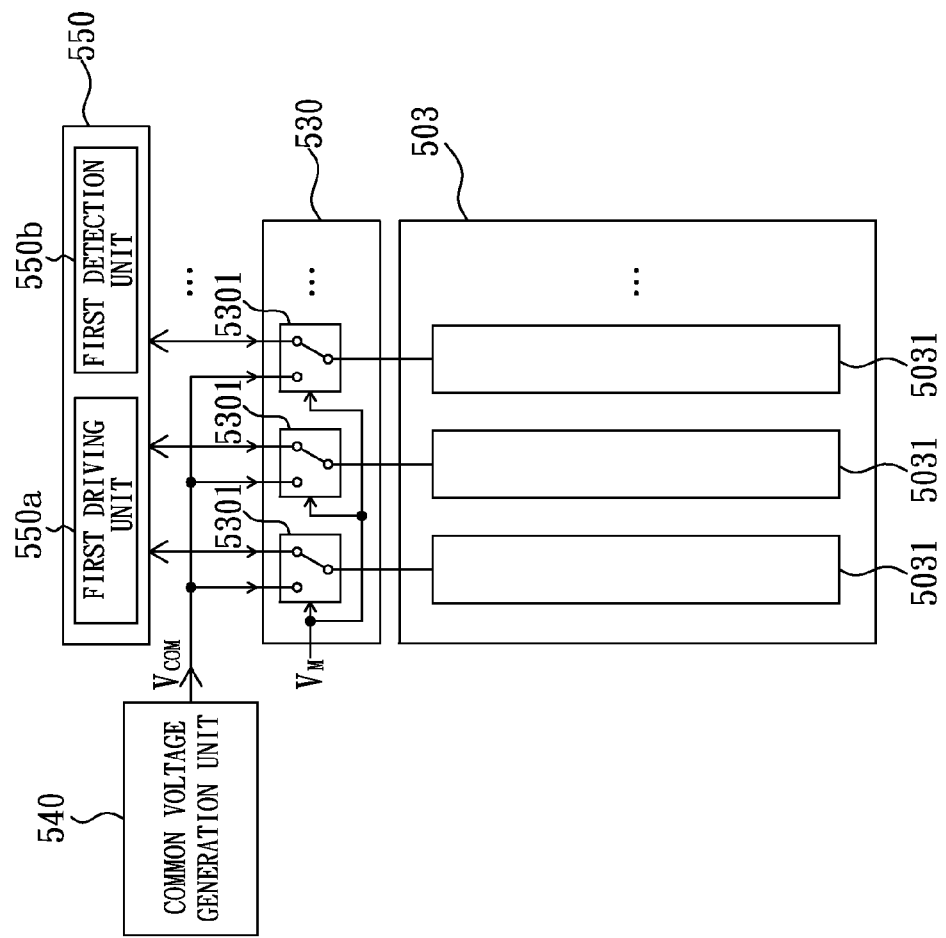
FIG. 7 illustrates a detailed structure of a transparent electrode layer of FIG. 5, and a circuit diagram formed by the transparent electrode layer, a first switch circuit, a common voltage generation unit, and a first touch detection unit.

FIG. 7 illustrates a detailed structure of the transparent electrode layer 503, and a circuit diagram formed by the transparent electrode layer 503, the first switch circuit 530, the common voltage generation unit 540, and the first touch detection unit 550. The transparent electrode layer 503 has multiple transparent electrodes 5031. The first switch circuit 530 has multiple switches 5301, each of which has a control end coupled with the mode control signal $V_M$, a first contact coupled to one of the multiple transparent electrodes 5031, a second contact coupled to the common voltage $V_{COM}$, and a third contact coupled to the first touch detection unit 550, wherein, when the mode control signal $V_M$ is at the first state, the first contact of each of the switches 5301 will be connected electrically with the second contact thereof; when the mode control signal $V_M$ is at the second state, the first contact of each of the switches 5301 will be connected electrically with the third contact thereof. The common voltage generation unit 540 is used to generate the common voltage $V_{COM}$. The first touch detection unit 550 has a first driving unit 550*a* and a first detection unit 550*b*. Besides, a first substrate (not shown in the figure), implemented by a transparent material like glass, polycarbonate, Polymethylmethacrylate, or Polyethylene Terephthalate, can be located above the transparent electrode layer 503 to provide a touch plane 5032.

Each of the multiple transparent electrodes 5031 can extend along one of the multiple source driving lines and oppose a column of the multiple first electrodes 5011, or extend along one of the multiple gate driving lines and oppose a row of the multiple first electrodes 5011.

The transparent electrode layer 503 can be implemented by a transparent ITO (Indium Tin Oxide; ITO) layer, and the multiple transparent electrodes 5031 can be of rectangular shape, square shape, triangular shape, or round shape, etc.

The TFT liquid crystal display apparatus having a touch function of FIG. 5 can provide multiple touch detection modes. When the gate control unit 510 makes each row of the thin film transistors 5012 turned off, a variety of touch detection modes can be provided as follows:

1. The first touch detection unit 550 can choose a part (the part can be whole) of multiple effective capacitors existing between the multiple transparent electrodes 5031 and the multiple storage-capacitor bottom electrodes 5013b to form a first sensing capacitor, and use the first sensing capacitor to perform the self capacitive detection procedure; or, choose two sets of electrodes of the multiple transparent electrodes 5031 to form a second sensing capacitor with each of the two sets of electrodes being connected electrically as one electrode, and use the second sensing capacitor to perform the self capacitive detection procedure or the mutual capacitive detection procedure.

2. The second touch detection unit 570 can choose a part (the part can be whole) of multiple effective capacitors existing between the multiple storage-capacitor bottom electrodes 5013b and the multiple transparent electrodes 5031 to form a third sensing capacitor, and use the third sensing capacitor to perform the self capacitive detection procedure; or, choose two sets of electrodes of the multiple storage-capacitor bottom electrodes 5013b to form a fourth sensing capacitor with each of the two sets of electrodes being connected electrically as one electrode, and use the fourth sensing capacitor to perform the self capacitive detection procedure or the mutual capacitive detection procedure.

3. The first touch detection unit 550 can operate cooperatively with the second touch detection unit 570 to perform the self capacitive detection procedure or the mutual capacitive detection procedure. For example, the self capacitive detection procedure can be performed by the first touch detection unit 550 with the second touch detection unit 570 providing a DC voltage; or performed by the second touch detection unit 570 with the first touch detection unit 550 providing a DC voltage.

The mutual capacitive detection procedure can be performed by having the first driving unit 550a of the first touch detection unit 550 providing a voltage signal, and the second detection unit 570b of the second touch detection unit 570 receiving a sensed signal; or the second driving unit 570a of the second touch detection unit 570 providing a voltage signal, and the first detection unit 550b of the first touch detection unit 550 receiving a sensed signal.

When the gate control unit 510 makes each row of the thin film transistors 5012 turned on, the first touch detection unit 550, the second touch detection unit 570, and the third touch detection unit 5202 can operate independently or cooperatively to use the sensing capacitor formed in the liquid crystal display structure 500 to perform the self capacitive detection procedure or the mutual capacitive detection procedure. As a result, a variety of touch detection modes can be provided as follows:

1. The first touch detection unit 550 can choose a part (the part can be whole) of multiple effective capacitors existing between the multiple transparent electrodes 5031 and the multiple first electrodes 5011 to form a fifth sensing capacitor, and use the fifth sensing capacitor to perform the self capacitive detection procedure; choose a part (the part can be whole) of multiple effective capacitors existing between the multiple transparent electrodes 5031 and the multiple storage-capacitor bottom electrodes 5013b to form a sixth sensing capacitor, and use the sixth sensing capacitor to perform the self capacitive detection procedure; or, choose two sets of electrodes of the multiple transparent electrodes 5031 to form a seventh sensing capacitor with each of the two sets of electrodes being connected electrically as one electrode, and use the seventh sensing capacitor to perform the self capacitive detection procedure or the mutual capacitive detection procedure.

2. The second touch detection unit 570 can choose a part (the part can be whole) of multiple capacitors existing between the multiple storage-capacitor bottom electrodes 5013b and the multiple storage-capacitor top electrodes 5013a to form an eighth sensing capacitor, and use the eighth sensing capacitor to perform the self capacitive detection procedure; choose a part (the part can be whole) of multiple capacitors existing between the multiple storage-capacitor bottom electrodes 5013b and the multiple transparent electrodes 5031 to form a ninth sensing capacitor, and use the ninth sensing capacitor to perform the self capacitive detection procedure; or, choose two sets of electrodes of the multiple storage-capacitor bottom electrodes 5013b to form a tenth sensing capacitor with each of the two sets of electrodes being connected electrically as one electrode, and use the tenth sensing capacitor to perform the self capacitive detection procedure or the mutual capacitive detection procedure.

3. The third touch detection unit 5202 can choose a part (the part can be whole) of multiple capacitors existing between the multiple first electrodes 5011 and the multiple transparent electrodes 5031 to form an eleventh sensing capacitor, and use the eleventh sensing capacitor to perform the self capacitive detection procedure; choose a part (the part can be whole) of multiple capacitors existing between the multiple first electrodes 5011 and the multiple storage-capacitor bottom electrodes 5013b to form a twelfth sensing capacitor, and use the twelfth sensing capacitor to perform the self capacitive detection procedure; or, choose two sets of electrodes of the multiple first electrodes 5011 to form a thirteenth sensing capacitor with each of the two sets of electrodes being connected electrically as one electrode, and use the thirteenth sensing capacitor to perform the self capacitive detection procedure or the mutual capacitive detection procedure.

4. The first touch detection unit 550 can operate cooperatively with the second touch detection unit 570 to perform the self capacitive detection procedure or the mutual capacitive detection procedure. For example, the self capacitive detection procedure can be performed by the first touch detection unit 550 with the second touch detection unit 570 providing a DC voltage; or performed by the second touch detection unit 570 with the first touch detection unit 550 providing a DC voltage.

The mutual capacitive detection procedure can be performed by having the first driving unit 550a of the first touch detection unit 550 providing a voltage signal, and the second detection unit 570b of the second touch detection unit 570 receiving a sensed signal; or the second driving unit 570a of the second touch detection unit 570 providing a voltage signal, and the first detection unit 550b of the first touch detection unit 550 receiving a sensed signal.

5. The first touch detection unit 550 can operate cooperatively with the third touch detection unit 5202 to perform the self capacitive detection procedure or the mutual capacitive detection procedure. For example, the self capacitive detection procedure can be performed by the first touch detection unit 550 with the third touch detection unit 5202 providing a DC voltage; or performed by the third touch detection unit 5202 with the first touch detection unit 550 providing a DC voltage.

The mutual capacitive detection procedure can be performed by having the first driving unit 550a of the first touch detection unit 550 providing a voltage signal, and the third detection unit 5202b of the third touch detection unit 5202 receiving a sensed signal; or the third driving unit 5202a of the third touch detection unit 5202 providing a voltage signal, and the first detection unit 550b of the first touch detection unit 550 receiving a sensed signal.

6. The second touch detection unit 570 can operate cooperatively with the third touch detection unit 5202 to perform the self capacitive detection procedure or the mutual capacitive detection procedure. For example, the self capacitive detection procedure can be performed by the second touch detection unit 570 with the third touch detection unit 5202 providing a DC voltage; or performed by the third touch detection unit 5202 with the second touch detection unit 570 providing a DC voltage. The mutual capacitive detection procedure can be performed by having the second driving unit 570a of the second touch detection unit 570 providing a voltage signal, and the third detection unit 5202b of the third touch detection unit 5202 receiving a sensed signal; or the third driving unit 5202a of the third touch detection unit 5202 providing a voltage signal, and the second detection unit 570b of the second touch detection unit 570 receiving a sensed signal.

7. The first touch detection unit 550, the second touch detection unit 570, and the third touch detection unit 5202 can operate cooperatively with each other to perform the self capacitive detection procedure or the mutual capacitive detection procedure. For example, the self capacitive detection procedure can be performed by the first touch detection unit 550 with the second touch detection unit 570 and the third touch detection unit 5202 each providing a DC voltage; or performed by the second touch detection unit 570 with the first touch detection unit 550 and the third touch detection unit 5202 each providing a DC voltage; or performed by the third touch detection unit 5202 with the first touch detection unit 550 and the second touch detection unit 570 each providing a DC voltage. The mutual capacitive detection procedure can be performed by having the first driving unit 550a of the first touch detection unit 550 providing a voltage signal, the second detection unit 570b of the second touch detection unit 570 receiving a first sensed signal, and the third detection unit 5202b of the third touch detection unit 5202 receiving a second sensed signal; or the second driving unit 570a of the second touch detection unit 570 providing a voltage signal, the first detection unit 550b of the first touch detection unit 550 receiving a first sensed signal, and the third detection unit 5202b of the third touch detection unit 5202 receiving a second sensed signal; or the third driving unit 5202a of the third touch detection unit 5202 providing a voltage signal, the first detection unit 550b of the first touch detection unit 550 receiving a first sensed signal, and the second detection unit 570b of the second touch detection unit 570 receiving a second sensed signal.

By using the foregoing designs, the present invention can utilize the liquid crystal display structure 500 to further perform a multi-stage touch detection procedure or a parallel touch detection procedure to increase touch detection efficiency and shorten touch detection time, and thereby complete at least one touch detection scan in idle intervals of a display scan of the liquid crystal display structure 500.

The multi-stage touch detection procedure includes stages of connecting multiple sensing capacitors in parallel to form different touch resolutions. For example, form an 1×1 resolution for a touch plane in first stage, a 2×2 resolution for the touch plane in second stage, and a 4×4 resolution for the touch plane in third stage, etc. By doing so, the touch detection time can be greatly reduced. Besides, the parallel touch detection procedure can execute a plurality of the self capacitive detection procedures or the mutual capacitive detection procedures at different electrodes of an electrode layer simultaneously, or execute a plurality of the self capacitive detection procedures or the mutual capacitive detection procedures on different effective capacitors existing between two electrode layers simultaneously.

Figure 8:
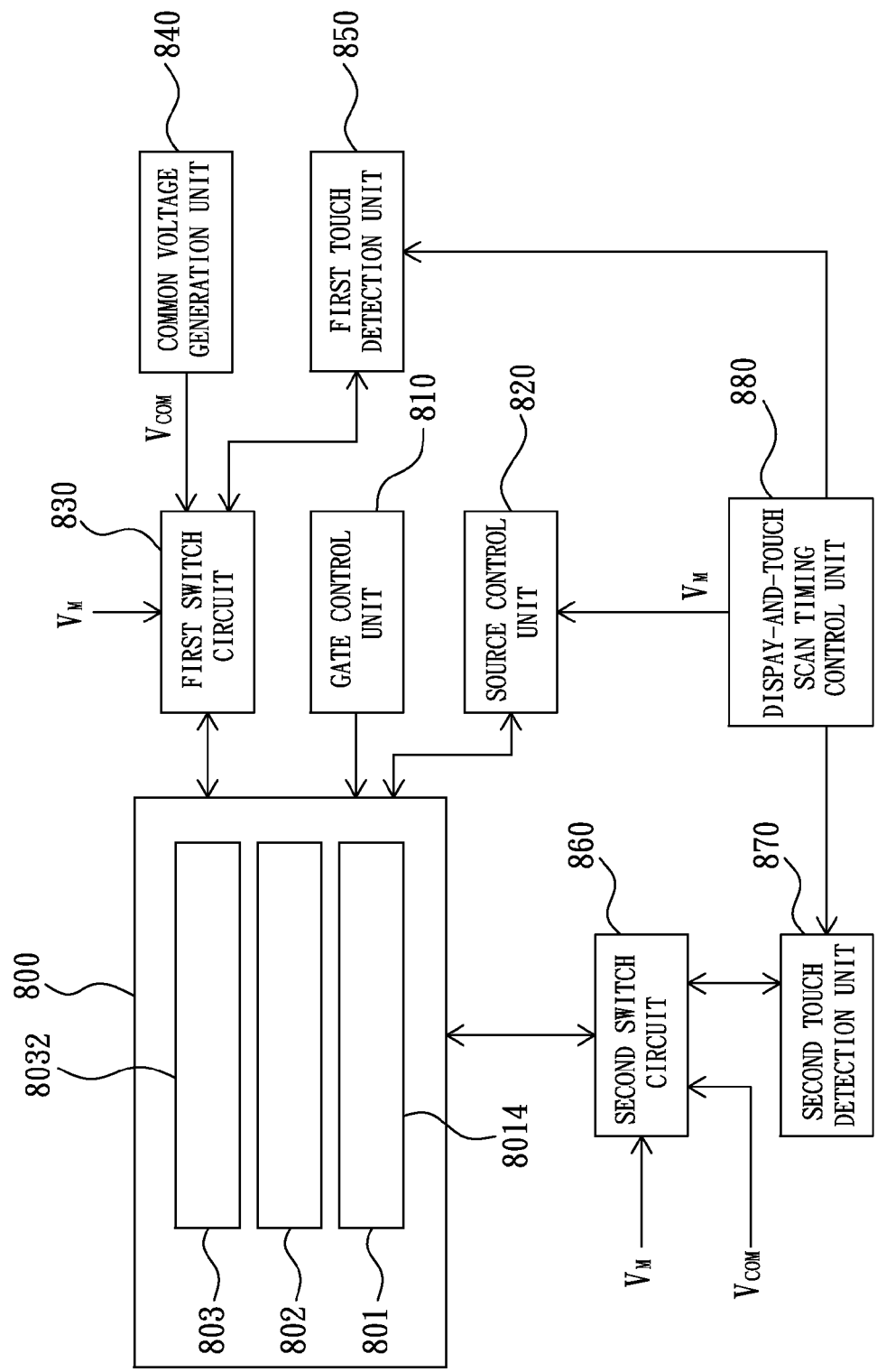
FIG. 8 illustrates a TFT liquid crystal display apparatus having a touch function according to another preferred embodiment of the present invention.

Based on the foregoing principle, the present invention proposes another embodiment. Please refer to FIG. 8, which illustrates a TFT liquid crystal display apparatus having a touch function according to another preferred embodiment of the present invention. As illustrated in FIG. 8, the TFT liquid crystal display apparatus having a touch function includes a liquid crystal display structure 800, a gate control unit 810, a source control unit 820, a first switch circuit 830, a common voltage generation unit 840, a first touch detection unit 850, a second switch circuit 860, a second touch detection unit 870, and a display-and-touch scan timing control unit 880.

The liquid crystal display structure 800 has a first electrode layer 801, a liquid crystal display layer 802, and a transparent electrode layer 803.

Figure 9:
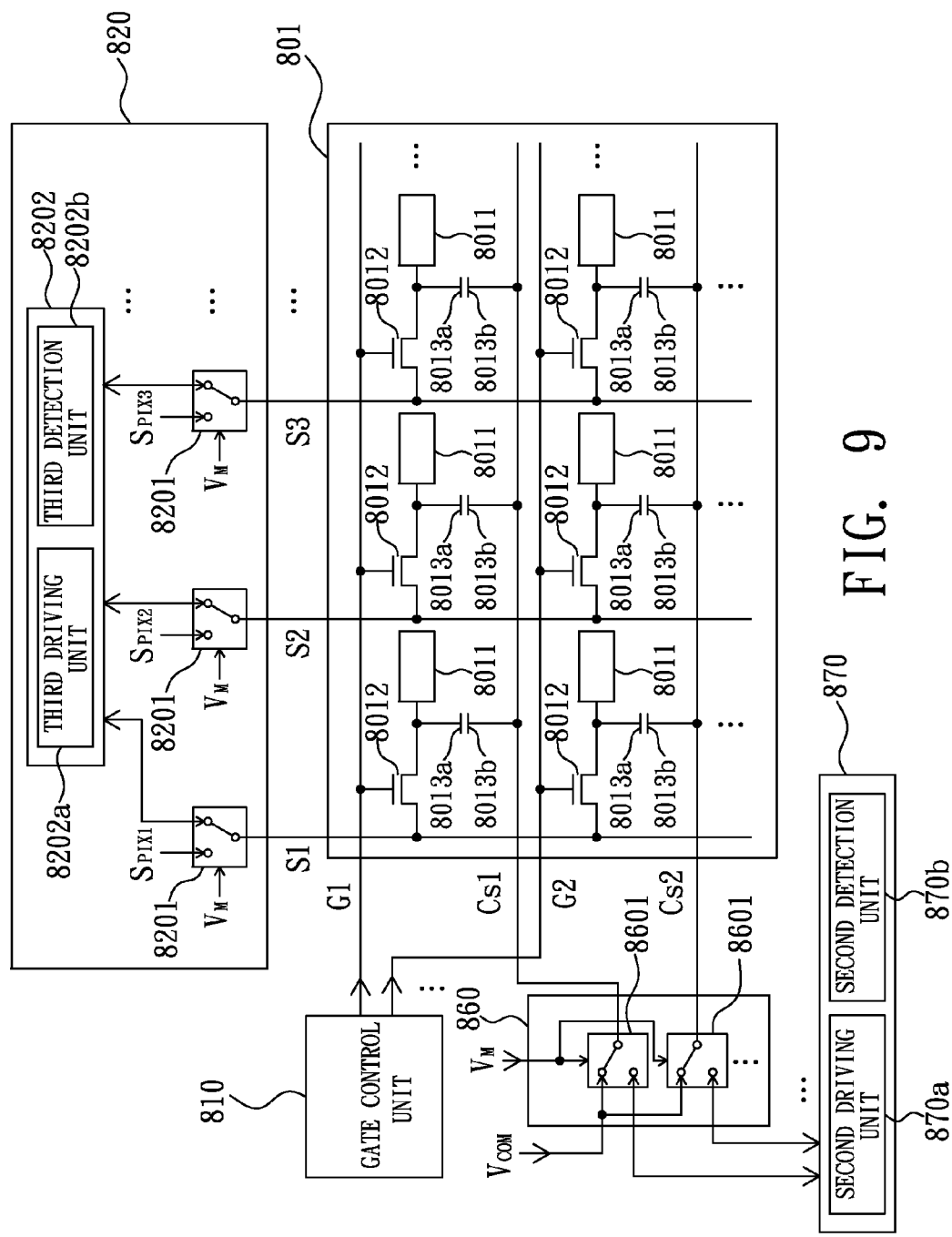
FIG. 9 illustrates a detailed structure of a first electrode layer of FIG. 8 and a circuit diagram formed by the first electrode layer, a gate control unit, a source control unit, a second switch circuit, and a second touch detection unit.

FIG. 9 illustrates a detailed structure of the first electrode layer 801 and a circuit diagram formed by the first electrode layer 801, the gate control unit 810, the source control unit 820, the second switch circuit 860, and the second touch detection unit 870. As illustrated in FIG. 9, the first electrode layer 801 has multiple first transparent electrodes 8011, multiple thin film transistors 8012, and multiple storage-capacitor top electrodes 8013a. Each of the multiple thin film transistors 8012 has a source, a gate, and a drain, wherein the drain is coupled to one of the multiple first transparent electrodes 8011 and to one of the multiple storage-capacitor top electrodes 8013a, the gate is coupled to one of multiple gate driving lines (G1, G2, . . . ), and the source is coupled to one of multiple source driving lines (S1, S2, . . . ). Each of the multiple gate driving lines is coupled with a row of the thin film transistors 8012, and each of the multiple source driving lines is coupled to a column of the thin film transistors 8012. Each of the multiple storage-capacitor top electrodes 8013a opposes one of multiple storage-capacitor bottom electrodes 8013b, and each row of the multiple storage-capacitor bottom electrodes 8013b are coupled to one of multiple storage-capacitor driving lines (Cs1, Cs2, . . . ). Besides, the first electrode layer 801 can be an ITO (Indium Tin Oxide) layer located above a second substrate (not illustrated in the figure), and the second substrate can be implemented by a transparent material like glass, polycarbonate, Polymethylmethacrylate, or Polyethylene Terephthalate to provide a second touch plane 8014 below the first electrode layer 801.

The gate control unit 810 is used to control the on/off of each row of the thin film transistors 8012 via the multiple gate driving lines.

The source control unit 820 has multiple switches 8201 and a third touch detection unit 8202, and the third touch detection unit 8202 has a third driving unit 8202a and a third detection unit 8202b. Each of the multiple switches 8201 has a control end coupled with a mode control signal $V_M$, a first contact coupled to one of the multiple source driving lines, a second contact coupled to one of multiple pixel signals ($S_{PIX1}$, $S_{PIX2}$, . . . ), and a third contact coupled to the third touch detection unit 8202. When the mode control signal $V_M$ is at a first state (for example, high level), the first contact of each of the multiple switches 8201 will be connected electrically with the second contact thereof; when the mode control signal $V_M$ is at a second state (for example, low level), the first contact of each of the multiple switches 8201 will be connected electrically with the third contact thereof.

The second switch circuit 860 has multiple switches 8601, each of which has a control end coupled with the mode control signal $V_M$, a fourth contact coupled to one of the multiple storage-capacitor driving lines, a fifth contact coupled to the common voltage $V_{COM}$, and a sixth contact coupled to the second touch detection unit 870, wherein, when the mode control signal $V_M$ is at the first state, the fourth contact of each of the switches 8601 will be connected electrically with the fifth contact thereof; when the mode control signal $V_M$ is at the second state, the fourth contact of each of the switches 8601 will be connected electrically with the sixth contact thereof. The second touch detection unit 870 has a second driving unit 870a and a second detection unit 870b.

Figure 10:
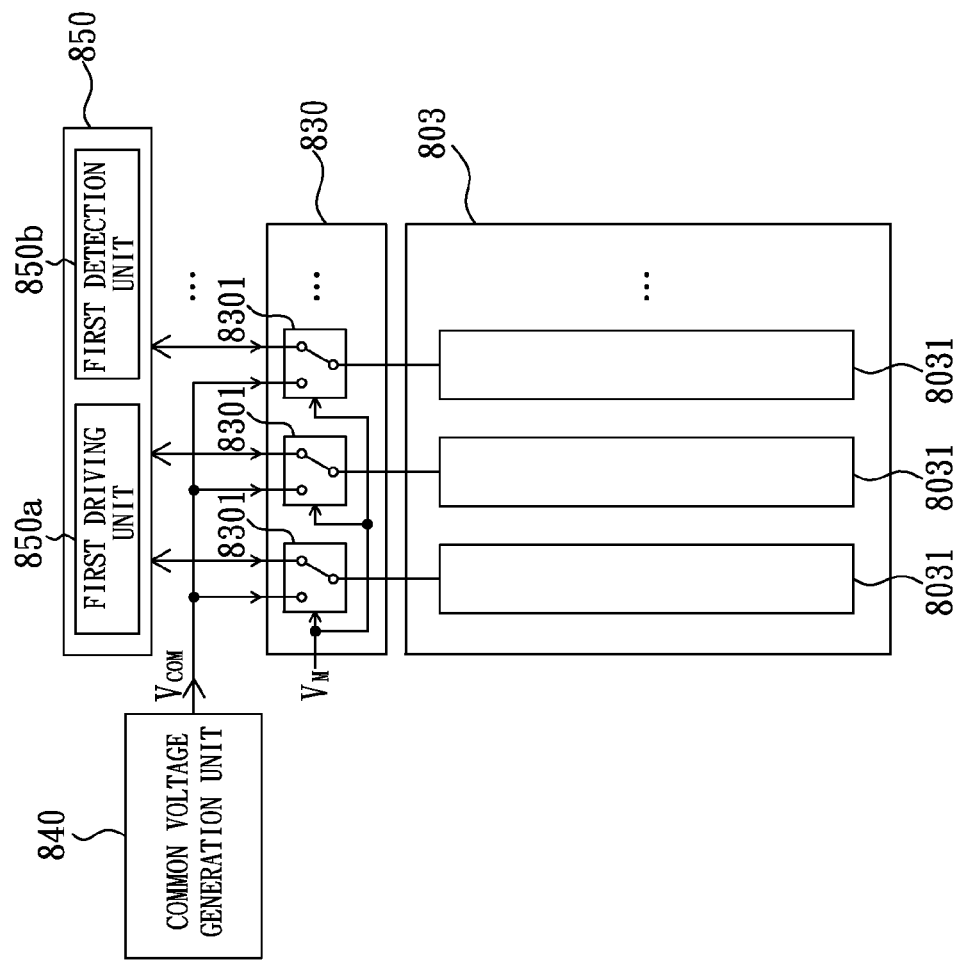
FIG. 10 illustrates a detailed structure of a transparent electrode layer of FIG. 8, and a circuit diagram formed by the transparent electrode layer, a first switch circuit, a common voltage generation unit, and a first touch detection unit.

FIG. 10 illustrates a detailed structure of the transparent electrode layer 803, and a circuit diagram formed by the transparent electrode layer 803, the first switch circuit 830, the common voltage generation unit 840, and the first touch detection unit 850. The transparent electrode layer 803 has multiple second transparent electrodes 8031. A first substrate (not shown in the figure), implemented by a transparent material like glass, polycarbonate, Polymethylmethacrylate, or Polyethylene Terephthalate, can be located above the transparent electrode layer 803 to provide a first touch plane 8032. The first switch circuit 830 has multiple switches 8301, each of which has a control end coupled with the mode control signal $V_M$, a first contact coupled to one of the multiple second transparent electrodes 8031, a second contact coupled to the common voltage $V_{COM}$, and a third contact coupled to the first touch detection unit 850, wherein, when the mode control signal $V_M$ is at the first state, the first contact of each of the switches 8301 will be connected electrically with the second contact thereof; when the mode control signal $V_M$ is at the second state, the first contact of each of the switches 8301 will be connected electrically with the third contact thereof. The common voltage generation unit 840 is used to generate the common voltage $V_{COM}$. The first touch detection unit 850 has a first driving unit 850a and a first detection unit 850b.

Each of the multiple second transparent electrodes 8031 can extend along one of the multiple source driving lines and oppose a column of the multiple first transparent electrodes 8011, or extend along one of the multiple gate driving lines and oppose a row of the multiple first transparent electrodes 8011.

The transparent electrode layer 803 can be implemented by a transparent ITO (Indium Tin Oxide; ITO) layer, and the multiple second transparent electrodes 8031 can be of rectangular shape, square shape, triangular shape, or round shape, etc.

As can be seen from the specification above, the TFT liquid crystal display apparatus having a touch function of FIG. 8 is not only capable of providing multiple touch detection modes—the operation principles thereof have been elaborated upon in the description above, so they will not be readdressed here—but also capable of offering a two-side touch function. Users can perform a touch operation on the first touch plane 8032 or on the second touch plane 8014.

In an application where an active three-dimension liquid crystal lens array is put atop a liquid crystal display to form a 3D display, as the materials used in the active three-dimension liquid crystal lens array is similar to that used in the liquid crystal display, the touch mechanism of the present invention can therefore be implemented on the active three-dimension liquid crystal lens array to also provide a touch function for the 3D display.

Thanks to the novel designs, the present invention possesses the following advantages:

1. The TFT liquid crystal display apparatus having a touch function of the present invention can utilize a liquid crystal display structure to detect a touch event.

2. The TFT liquid crystal display apparatus having a touch function of the present invention can utilize two electrode layers of a liquid crystal display structure to execute a self capacitive touch detection procedure or a mutual capacitive touch detection procedure.

3. The TFT liquid crystal display apparatus having a touch function of the present invention can utilize an electrode layer of a liquid crystal display structure to execute a self capacitive touch detection procedure or a mutual capacitive touch detection procedure.

4. The TFT liquid crystal display apparatus having a touch function of the present invention can utilize a liquid crystal display structure to execute a multi-stage touch detection procedure to detect a touch event in a much shorter time.

5. The TFT liquid crystal display apparatus having a touch function of the present invention can utilize a liquid crystal display structure to execute a parallel touch detection procedure to detect a touch event in a much shorter time.

6. The TFT liquid crystal display apparatus having a touch function of the present invention can support two touch planes.

7. The TFT liquid crystal display apparatus having a touch function of the present invention can utilize an active 3D liquid crystal Lens array of a 3D TFT liquid crystal display to detect a touch event.

8. The TFT liquid crystal display apparatus having a touch function of the present invention can simplify the structure of a touch screen to reduce the depth, increase the yield rate, and reduce the manufacturing cost thereof.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. TFT liquid crystal display apparatus having a touch function, comprising:
   a first electrode layer, having multiple first electrodes and multiple thin film transistors;
   each of said multiple thin film transistors having a source, a gate, and a drain;
   said source being coupled to a source control unit;
   said gate being coupled to a gate control unit;
   said drain being coupled to one of said multiple first electrodes and to one of multiple storage capacitors;
   a liquid crystal display layer, located above said first electrode layer;
   a transparent electrode layer, being located above said liquid crystal display layer and having multiple transparent strip electrodes, wherein a touch plane is provided above said transparent electrode layer and each of said multiple transparent strip electrodes opposes at least one of said multiple first electrodes;
   multiple switches, each of which having a control end, a first contact, a second contact, and a third contact;
   said control end being coupled with a mode control signal;
   said first contact being coupled to one of said multiple transparent strip electrodes;
   said second contact being coupled to a common voltage generation unit;

said third contact being coupled to a first touch detection unit;

when said mode control signal is at a first state, said first contact connects electrically with said second contact; and when said mode control signal is at a second state, said first contact connects electrically with said third contact.

2. The TFT liquid crystal display apparatus having a touch function as claim 1, wherein, when said mode control signal is at said first state, said source control unit outputs multiple pixel signals, each coupled to said source of a corresponding one of said multiple thin film transistors; and when said mode control signal is at said second state, said source control unit provides a second touch detection unit to couple with said source of each of said multiple thin film transistors.

3. The TFT liquid crystal display apparatus having a touch function as claim 2, wherein said first touch detection unit has a first driving unit and a first detection unit, and said second touch detection unit has a second driving unit and a second detection unit.

4. The TFT liquid crystal display apparatus having a touch function as claim 3, wherein, when said gate control unit makes said multiple thin film transistors turned off, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

5. The TFT liquid crystal display apparatus having a touch function as claim 3, wherein, when said gate control unit makes said multiple thin film transistors turned on, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

6. The TFT liquid crystal display apparatus having a touch function as claim 3, wherein, when said gate control unit makes said multiple thin film transistors turned on, said second touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

7. The TFT liquid crystal display apparatus having a touch function as claim 3, wherein, when said gate control unit makes said multiple thin film transistors turned on, said first touch detection unit and said second touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

8. The TFT liquid crystal display apparatus having a touch function as claim 3, further including a first substrate, which is located above said transparent electrode layer and implemented by a transparent material selected from a group consisting of glass, polycarbonate, Polymethylmethacrylate, Polyethylene Terephthalate, and any combinations thereof.

9. The TFT liquid crystal display apparatus having a touch function as claim 8, wherein said first electrode layer is located above a second substrate, and said second substrate is implemented by a transparent material selected from a group consisting of glass, polycarbonate, Polymethylmethacrylate, Polyethylene Terephthalate, and any combinations thereof.

10. A TFT liquid crystal display apparatus having a touch function, comprising:

a first electrode layer, having multiple first electrodes, multiple storage-capacitor top electrodes, and multiple thin film transistors;

each of said multiple thin film transistors having a source, a gate, and a drain;

said source being coupled to a source control unit;

said gate being coupled to a gate control unit;

said drain being coupled to one of said multiple first electrodes and to one of said multiple storage-capacitor top electrodes;

a liquid crystal display layer, located above said first electrode layer;

a transparent electrode layer, being located above said liquid crystal display layer and having multiple transparent strip electrodes, wherein a touch plane is provided above said transparent electrode layer and each of said multiple transparent strip electrodes opposes at least one of said multiple first electrodes;

multiple first switches, each of which having a first control end, a first contact, a second contact, and a third contact;

said first control end being coupled with a mode control signal;

said first contact being coupled to one of said multiple transparent strip electrodes;

said second contact being coupled to a common voltage generation unit;

said third contact being coupled to a first touch detection unit;

when said mode control signal is at a first state, said first contact connects electrically with said second contact;

when said mode control signal is at a second state, said first contact connects electrically with said third contact;

multiple second switches, each of which having a second control end, a fourth contact, a fifth contact, and a sixth contact, said second control end being coupled with said mode control signal;

said fourth contact being coupled to one of multiple storage-capacitor bottom electrodes;

said fifth contact being coupled to said common voltage generation unit;

said sixth contact being coupled to a second touch detection unit;

when said mode control signal is at said first state, said fourth contact connects electrically with said fifth contact; and when said mode control signal is at said second state, said fourth contact connects electrically with said sixth contact.

11. The TFT liquid crystal display apparatus having a touch function as claim 10, wherein, when said mode control signal is at said first state, said source control unit outputs multiple pixel signals; and when said mode control signal is at said second state, said source control unit provides a third touch detection unit to couple with said source of each of said multiple thin film transistors.

12. The TFT liquid crystal display apparatus having a touch function as claim 11, wherein said first touch detection unit has a first driving unit and a first detection unit, said second touch detection unit has a second driving unit and a second detection unit, and said third touch detection unit has a third driving unit and a third detection unit.

13. The TFT liquid crystal display apparatus having a touch function as claim 12, wherein, when said gate control unit makes said multiple thin film transistors turned off, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

14. The TFT liquid crystal display apparatus having a touch function as claim 12, wherein, when said gate control unit makes said multiple thin film transistors turned off, said second touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

15. The TFT liquid crystal display apparatus having a touch function as claim 12, wherein, when said gate control unit makes said multiple thin film transistors turned off, said first touch detection unit and said second touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

16. The TFT liquid crystal display apparatus having a touch function as claim 12, wherein, when said gate control unit makes said multiple thin film transistors turned on, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

17. The TFT liquid crystal display apparatus having a touch function as claim 12, wherein, when said gate control unit makes said multiple thin film transistors turned on, said second touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

18. The TFT liquid crystal display apparatus having a touch function as claim 12, wherein, when said gate control unit makes said multiple thin film transistors turned on, said third touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

19. The TFT liquid crystal display apparatus having a touch function as claim 12, wherein, when said gate control unit makes said multiple thin film transistors turned on, said first touch detection unit and said second touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

20. The TFT liquid crystal display apparatus having a touch function as claim 12, wherein, when said gate control unit makes said multiple thin film transistors turned on, said second touch detection unit and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

21. The TFT liquid crystal display apparatus having a touch function as claim 12, wherein, when said gate control unit makes said multiple thin film transistors turned on, said first touch detection unit and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

22. The TFT liquid crystal display apparatus having a touch function as claim 12, wherein, when said gate control unit makes said multiple thin film transistors turned on, said first touch detection unit, said second touch detection unit, and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

23. The TFT liquid crystal display apparatus having a touch function as claim 12, further including a first substrate, which is located above said transparent electrode layer and implemented by a transparent material selected from a group consisting of glass, polycarbonate, Polymethylmethacrylate, Polyethylene Terephthalate, and any combinations thereof.

24. The TFT liquid crystal display apparatus having a touch function as claim 23, wherein said first electrode layer is located above a second substrate, and said second substrate is implemented by a transparent material selected from a group consisting of glass, polycarbonate, Polymethylmethacrylate, Polyethylene Terephthalate, and any combinations thereof.

25. A TFT liquid crystal display apparatus having a touch function, comprising:
a first electrode layer, having multiple first transparent electrodes, multiple storage-capacitor top electrodes, and multiple thin film transistors;
a second touch plane being provided below said first electrode layer;
each of said multiple thin film transistors having a source, a gate, and a drain;
said source being coupled to a source control unit;
said gate being coupled to a gate control unit;
said drain being coupled to one of said multiple first transparent electrodes and to one of said multiple storage-capacitor top electrodes;
said source control unit outputting multiple pixel signals when a mode control signal is at a first state, and provides a third touch detection unit to couple with said source of each of said multiple thin film transistors when said mode control signal is at a second state;
a liquid crystal display layer, located above said first electrode layer;
a transparent electrode layer, being located above said liquid crystal display layer and having multiple second transparent electrodes, wherein a first touch plane is provided above said transparent electrode layer and each of said multiple second transparent electrodes opposes at least one of said multiple first transparent electrodes;
multiple first switches, each of which having a first control end, a first contact, a second contact, and a third contact;
said first control end being coupled with said mode control signal;
said first contact being coupled to one of said multiple second transparent electrodes;
said second contact being coupled to a common voltage generation unit;
said third contact being coupled to a first touch detection unit;
when said mode control signal is at said first state, said first contact connects electrically with said second contact;

when said mode control signal is at said second state, said first contact connects electrically with said third contact;

multiple second switches, each of which having a second control end, a fourth contact, a fifth contact, and a sixth contact;

said second control end being coupled with said mode control signal;

said fourth contact being coupled to one of multiple storage-capacitor bottom electrodes;

said fifth contact being coupled to said common voltage generation unit;

said sixth contact being coupled to a second touch detection unit;

when said mode control signal is at said first state, said fourth contact connects electrically with said fifth contact;

when said mode control signal is at said second state, said fourth contact connects electrically with said sixth contact; and a display-and-touch scan timing control unit, used for generating said mode control signal.

26. The TFT liquid crystal display apparatus having a touch function as claim 25, wherein, when said gate control unit makes said multiple thin film transistors turned off, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

27. The TFT liquid crystal display apparatus having a touch function as claim 25, wherein, when said gate control unit makes said multiple thin film transistors turned off, said second touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

28. The TFT liquid crystal display apparatus having a touch function as claim 25, wherein, when said gate control unit makes said multiple thin film transistors turned off, said first touch detection unit and said second touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

29. The TFT liquid crystal display apparatus having a touch function as claim 25, wherein, when said gate control unit makes said multiple thin film transistors turned on, said first touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

30. The TFT liquid crystal display apparatus having a touch function as claim 25, wherein, when said gate control unit makes said multiple thin film transistors turned on, said second touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

31. The TFT liquid crystal display apparatus having a touch function as claim 25, wherein, when said gate control unit makes said multiple thin film transistors turned on, said third touch detection unit is used to perform a capacitive touch detection procedure, wherein said capacitive touch detection procedure is one selected from a group consisting of a self capacitive touch detection procedure, a mutual capacitive touch detection procedure, and any combinations thereof.

32. The TFT liquid crystal display apparatus having a touch function as claim 25, wherein, when said gate control unit makes said multiple thin film transistors turned on, said first touch detection unit and said second touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

33. The TFT liquid crystal display apparatus having a touch function as claim 25, wherein, when said gate control unit makes said multiple thin film transistors turned on, said second touch detection unit and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

34. The TFT liquid crystal display apparatus having a touch function as claim 25, wherein, when said gate control unit makes said multiple thin film transistors turned on, said first touch detection unit and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

35. The TFT liquid crystal display apparatus having a touch function as claim 25, wherein, when said gate control unit makes said multiple thin film transistors turned on, said first touch detection unit, said second touch detection unit, and said third touch detection unit operate cooperatively to perform a capacitive touch detection procedure, wherein said capacitive touch detection procedure is one selected from a group consisting of a self capacitive touch detection procedure, a mutual capacitive touch detection procedure, and any combinations thereof.

36. The TFT liquid crystal display apparatus having a touch function as claim 25, further including a first substrate, which is located above said transparent electrode layer and implemented by a transparent material selected from a group consisting of glass, polycarbonate, Polymethylmethacrylate, Polyethylene Terephthalate, and any combinations thereof.

37. The TFT liquid crystal display apparatus having a touch function as claim 36, wherein said first electrode layer is an ITO layer located above a second substrate, and said second substrate is implemented by a transparent material selected from a group consisting of glass, polycarbonate, Polymethylmethacrylate, Polyethylene Terephthalate, and any combinations thereof.

* * * * *